Dec. 9, 1924.
H. HART
INTERCHANGEABLE BATTERY SYSTEM FOR RADIO SETS
Filed June 7, 1924
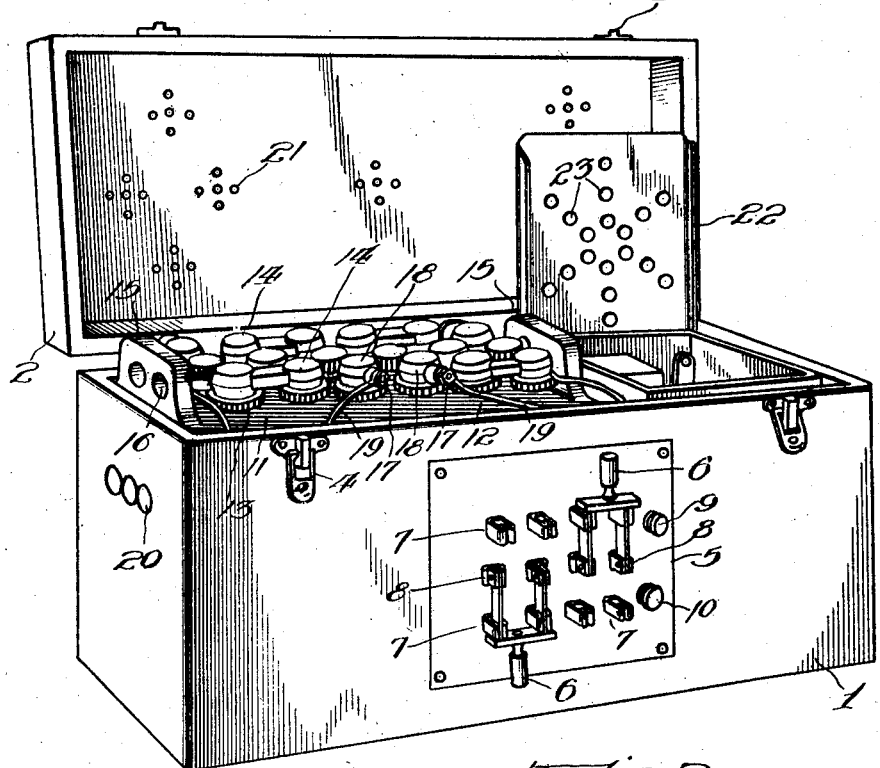
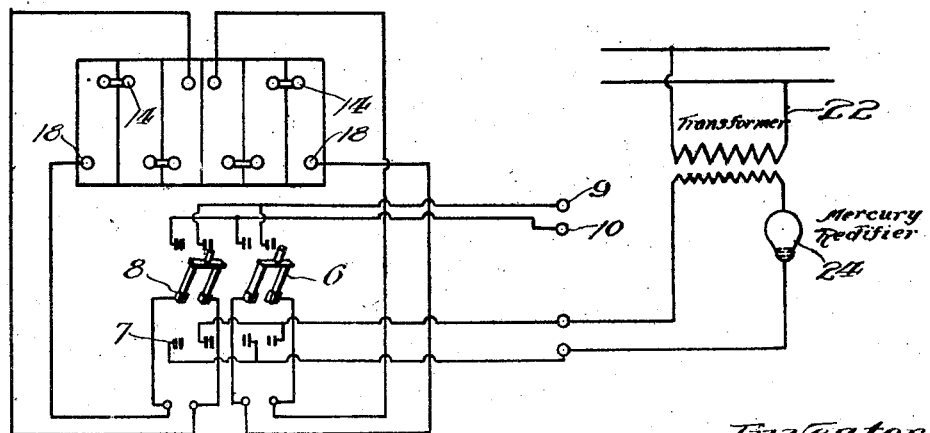

Patented Dec. 9, 1924.

1,518,508

UNITED STATES PATENT OFFICE.

HARRY HART, OF CHICAGO, ILLINOIS, ASSIGNOR OF ONE-THIRD TO JULIUS B. RUBENSTEIN AND ONE-THIRD TO JACOB I. GOLDSTEIN, BOTH OF CHICAGO, ILLINOIS.

INTERCHANGEABLE BATTERY SYSTEM FOR RADIO SETS.

Application filed June 7, 1924. Serial No. 718,644.

*To all whom it may concern:*

Be it known that I, HARRY HART, a citizen of the United States, residing in the city of Chicago, county of Cook, and State of Illinois, have invented certain new and useful Improvements in Interchangeable Battery Systems for Radio Sets, of which the following is a specification.

This invention relates to interchangeable battery arrangement for radio sets, and refers more particularly to the combination of a container in which are positioned interchangeable batteries and a source such as a transformer and rectifier for recharging said batteries.

The invention contemplates in particular the provision of a double battery, one of which is adapted to supply current to filaments in the tubes used in radio sets, while the other battery which has been discharged is being recharged. The transformer and rectifier for recharging the discharged battery is mounted in the same container.

In the past, one of the disadvantages to the average user of radio sets, where one battery only has been used, has been that the battery after continuous service for a certain period of time has had its energy and pressure discharged to such an extent that it must be disconnected from the radio set and charged. This has proved to be a source of very great inconvenience to the user of radio sets due to the fact that his radio set must be out of use during the time the single battery is being charged, and also, if the user has no rectifier, he must take the battery to a service station and there have it recharged.

My invention is particularly designed to overcome these many objections and provide in a single container an interchangeable battery arrangement which allows the radio set to be used on a continuous 100% basis, due to the fact that one battery is discharging current to the set while the other battery is simultaneously being recharged, the transformer and rectifier taking its electric energy from the ordinary light socket and decreasing the current of such energy to such an extent that the battery can be charged to the desired degree. In addition it is a well-known fact that batteries can not be charged with anything but direct current, the transformer and rectifier is used to simultaneously recharge and rectify the alternating current source.

In the drawings

Fig. 1 is a perspective view of the container with the battery arrangement and rectifier in position.

Fig. 2 is a diagrammatic view of the electric connections from and to the container.

Referring in detail to the drawings: 1 designates a rectangular container which may be of wood, light metal, hard rubber, or other similar composition combining the qualities of rigidity and durability. This container is provided with cover 2 which may be hinged thereto; this cover has the locks 3 which when the cover is in closed position are adapted to register with the clasps 4. On the front of the container is the panelboard 5 provided with two double pole, double throw, back connected knife switches 6 having terminals 7 and hinged at 8. Panel is provided with two terminals 9 and 10 which connect the radio set with the battery current.

Referring now to the particular novelty of the present invention, there is placed within the container 1 two 60-ampere hour batteries 11 and 12 which are preferably adapted to be charged independent of each other but which can be discharged in parallel making 120 ampere hours. Each battery is of the usual 3-cell type with 7 plates and 6 separators. The cells are closed by rubber covers or washers 13 and the cells are connected with the connecting straps 14 as is usual in batteries of this construction. These two batteries are mounted in one hard rubber container, the upper portion of which is shown at 15, having the hand holes 16 to assist in withdrawing same from the container 1. The positive and negative current sources are connected by means of the wing nuts 17 to the terminals 18, armored wires 19 leading to and from the terminals having their ends connected back of the panel 5 to the terminal hinges 8. The container 1 is provided with ventilating holes or hand grip holes 20 and the cover is also provided with ventilating holes 21. It must be understood that these holes 20 are also provided in the back. There may be as many as necessary.

Adjacent the battery box 15 and within the container 1 is the rectifier 22 which may be of the standard Westinghouse type for transforming and changing alternating current to direct current. The cover of this rectifier has ventilating holes 23. It is not thought necessary to describe this combined rectifier and transformer in detail as it is of the standard Westinghouse construction.

Referring now to the diagrammatic showing in Fig. 2, assume that one battery has been completely discharged and the second battery, which of course is charged, is connected with the radio set. A connection is made between any source of power such as the ordinary electric light commercial source and the transformer 22. Assume that the source of power supplies alternating current. It is necessary to change this alternating current to direct current; this is done by means of the mercury rectifier 24, the transformer 22 also decreasing the voltage from, say, 110 to say, 15 volts. The current passing the mercury rectifier 24 is supplied to recharge the battery which has been completely discharged. It will thus be seen that I simultaneously recharge a discharged battery while supplying current from a charged battery to the radio set.

If direct current is used the mercury rectifier is not used but in place of same a resistance is interposed in the circuit as is usual to decrease the voltage and current value, so that the charging rate will not exceed 2 amperes. The switches 6 being located on the outside of the container 1 are manually adjustable instantly.

It will be seen from the foregoing that as far as the batteries are concerned the radio set can be kept in practically continuous service as at no time is there a depleted storage battery, if charging current is available. Employing my invention it is no longer necessary that a radio set be out of commission while the battery is being charged.

The connections are so made that the owner of a radio receiving set can be assured that it is practically fool-proof in charging and discharging his batteries after the original connections are made properly. All that is necessary is to manipulate the knife switches 6 either up for transmitting current to the radio set and down to recharge a discharged battery.

In Fig. 2 I have clearly shown the connections between the knife switches, the terminals 7 and 8 on the panel 5, and the connections with the batteries and terminals 9 and 10 to the radio set. The panel 5 may be of bakelite or other suitable material having the proper di-electric strength.

I have shown and described a dual battery arrangement contained in one battery box. This, of course, tends to commercial economy and is one of the features of the invention.

I am aware that heretofore dual battery arrangements have been patented but I believe I am the first to provide a dual battery arrangement for use with radio sets in which one battery can be recharged while the other is discharged.

I claim as my invention:

1. In an interchangeable battery arrangement, the combination with an enlarged container, interchangeable batteries removably supported therein and combined rectifier and transformer also mounted in the container, connections between the rectifier and the batteries, connections from the batteries to a radio receiving set, means for discharging current from one battery to the radio set while simultaneously recharging a discharged battery.

2. In a construction of the character described, the combination with an enlarged container of a panel mounted thereon, knife switches and terminals on said panel, a plurality of batteries removably supported within the container, a combined transformer and rectifier also removably mounted in the container, connections between the batteries and the terminals on the panel, and means for simultaneously discharging current from one battery to a radio receiving set while another discharged battery is being simultaneously recharged.

3. In an interchangable battery arrangment, the combination with a container, interchangeable batteries and current limiting medium mounted so as to occupy substantially the entire space within the container, connections between the current limiting medium and the batteries, connections from the batteries to a radio receiving set, means for supplying current from one battery to the radio set while simultaneously charging the discharged battery.

4. In a construction of the character described, the combination with a container having electric switches and terminals exterior thereof, a plurality of batteries and a combined transformer and rectifier both mounted so as to have a substantially snug fit within the container, connections between the battery and the terminals on the container, and means including the switches and terminals for simultaneously discharging current from one battery to a radio receiving set while the other battery is being simultaneously recharged.

5. In a construction of the character described, the combination with a container having electric switches and terminals exterior thereof, a plurality of batteries and a current limiting medium both mounted within the container and occupying substantially the entire space within said container, connections between the battery and the terminals on the container, and means including the switches and terminals for simultaneously discharging current from one battery to a radio receiving set while the other battery is being simultaneously recharged.

HARRY HART.